Dec. 8, 1964    J. R. BLACK    3,160,032
EPICYCLIC SPEED CHANGING DEVICE AND GEAR FORM THEREFOR
Filed May 25, 1961    2 Sheets-Sheet 1
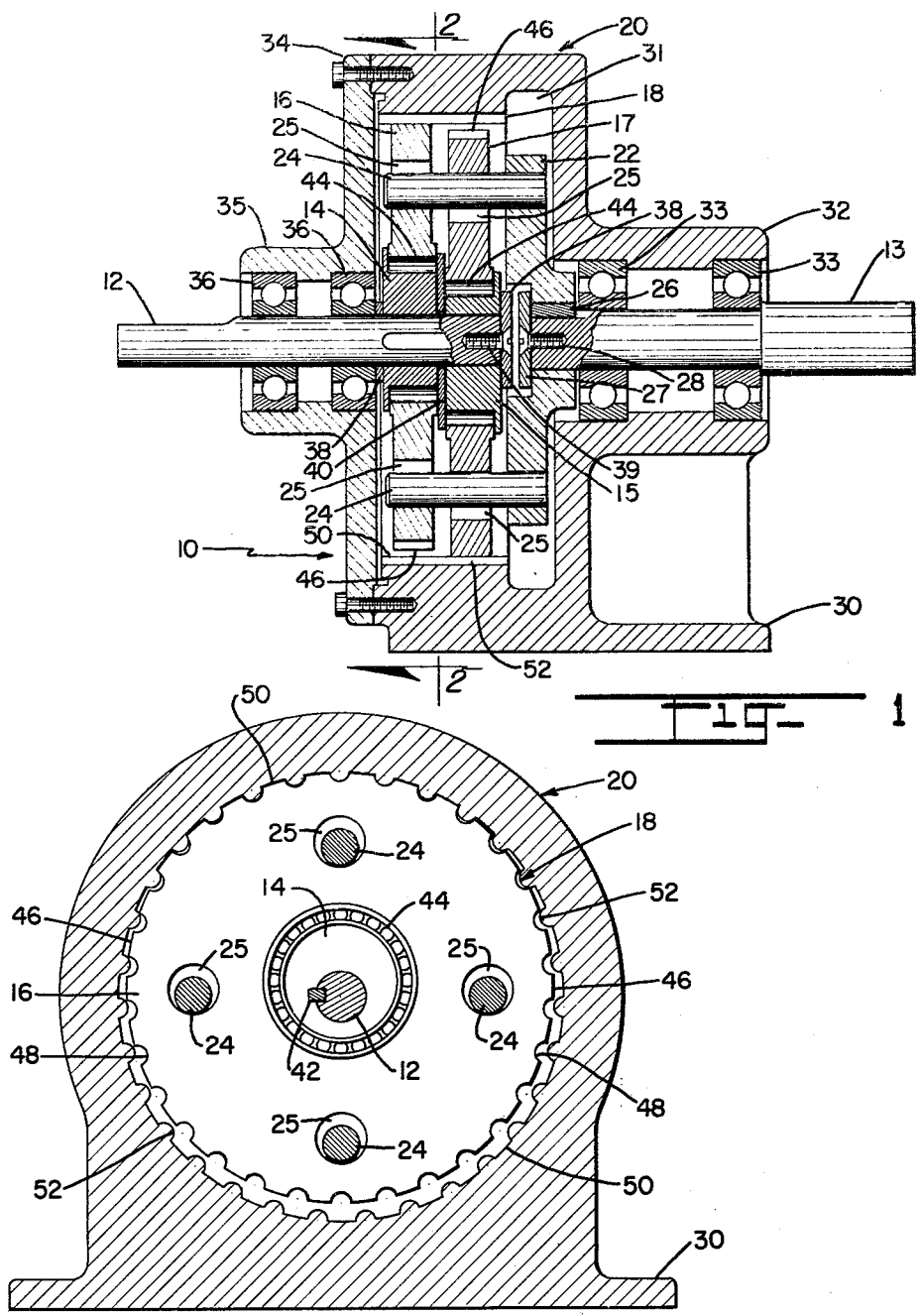
INVENTOR.
JOHN R. BLACK
BY John E. Reilly
ATTORNEY Dec. 8, 1964   J. R. BLACK   3,160,032
EPICYCLIC SPEED CHANGING DEVICE AND GEAR FORM THEREFOR
Filed May 25, 1961   2 Sheets-Sheet 2
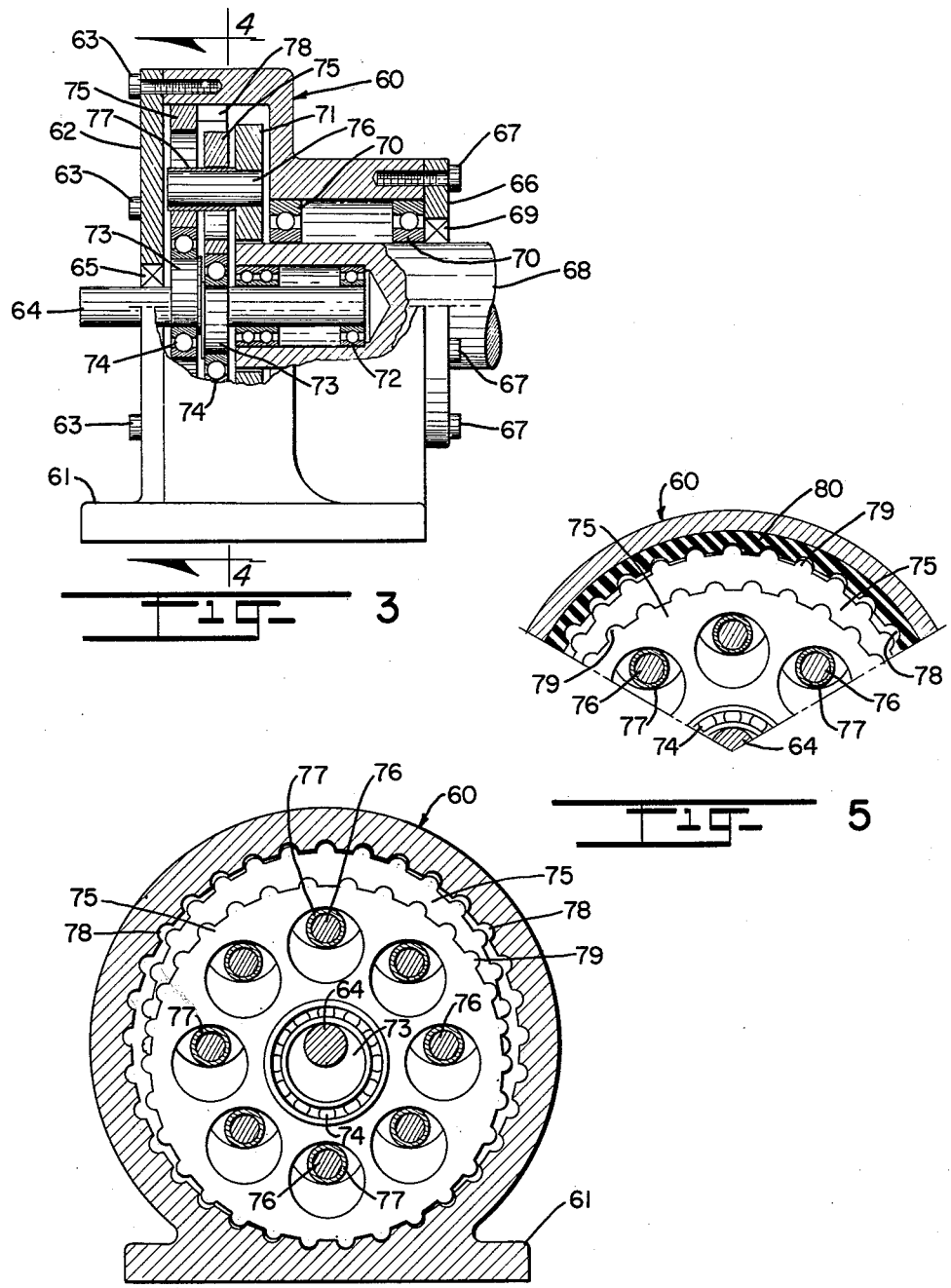
INVENTOR.
JOHN R. BLACK
BY John E. Reilly
ATTORNEY

United States Patent Office 3,160,032
Patented Dec. 8, 1964

3,160,032
EPICYCLIC SPEED CHANGING DEVICE AND
GEAR FORM THEREFOR
John R. Black, Englewood, Colo., assignor to Black
Tool, Inc., Denver, Colo., a corporation of Colorado
Filed May 25, 1961, Ser. No. 112,660
7 Claims. (Cl. 74—804)

This invention generally relates to speed changing units, and more specifically relates to a new and useful gear form especially adapted for use in epicyclic gearing for the purpose of speed increase or reduction between a pair of drive and driven members. This application is a continuation-in-part of my earlier co-pending U.S. patent application, Serial No. 835,220 filed August 21, 1959, now abandoned.

It is customary to employ epicyclic gearing as a means of transmission in speed changing units such as speed reducers. Typical examples of reducers of this type are illustrated in the Henry Patents No. 2,382,482 and No. 2,520,282. Such units can be made at a relatively low cost, are compact and durable, and furthermore are capable of effecting substantial speed reduction. Moreover, units of this type can be easily balanced in operation and are conformable for use in a number of different applications; also, they can be coupled directly in a number of ways to other power sources, such as electric motors, to attain high speed reduction or increase.

With the above in mind, it is a principal and foremost object of the present invention to provide for a vastly improved epicyclic gear system for use in a speed changing device as an effective means of regulating relative speed between the drive and driven members, and the gear system being so constructed and arranged as to substantially reduce friction or slippage between the gears, and to enable greater speed reduction, particularly for a given pitch or number of teeth utilized. In connection with the latter, the gear form of the present invention offers a much stronger gear construction for a given speed reduction and makes possible a much wider range of speed reduction for a given sized gearing and number of teeth while reducing the number of parts to a minimum.

It is another object of the present invention to provide for a novel and improved gear form which minimizes the number of gear elements necessary for a given speed ratio, reduces energy losses due to friction and slippage between gears as well as bending moments imposed on the gear elements, and also permits accurate alignment and control of the pressure angle between gear elements for most efficient and smoothest operation.

It is a further object to make provision for a gear form defining an integral part of the over-all gear construction in an epicyclic gear system offering the above advantages and features and which further makes more practical the use of resilient materials in the construction of the gear form for reduced noise.

It is an additional object of the present invention to provide for an epicyclic gear system which is compact, characterized by little backlash and smoother operation between relatively moving parts and which is conformable for use in a number of different applications requiring speed variation between parts.

It is a still further object to make provision for a gear form particularly adapted for use in epicyclic gearing which greatly simplifies theoretical considerations to be taken into account in gear forming for each given application, enables a much broader range in speed ratio, and durability and dependability in operation.

In accordance with the present invention, the principal advantages and features thereof are best exemplified by describing the novel gear form in association with an epicyclic speed reducer. Broadly, the gear form of the present invention may be utilized in this setting to effect non-slipping positive engagement between a pair of circular internal and external gear portions, and where essentially the epicyclic motion is that established by the rolling path of the external gear portion about the inside of the larger internal gear. In this arrangement, the gear form of the present invention is best characterized by a plurality of equally-spaced tooth elements of semi-circular configuration radially protruding from the circumferential surface portion of one gear at its pitch diameter, and a complementary series of equally-spaced cavity elements similarly of semi-circular configuration and which are formed to intrude from the circumferential surface portion of the other gear, and where fundamentally the complementary tooth and cavity elements are constructed and arranged to correspond in spacing and radius of curvature in order to establish intermeshing centered engagement therebetween. It will be noted that formation in this manner results in a material departure from known tooth forms where generally there is established intermeshing engagement between complementary tooth members, whereas here there is intermeshing engagement only between teeth formed on one gear with cavity elements formed on the other gear. Furthermore, by comparison with the construction and arrangement shown in known forms of epicyclic gear constructions, such as those disclosed in the aforementioned patents, and particularly Patent No. 2,520,282, this invention eliminates a number of problems encountered in the formation and insertion of separate pin elements as a part of the gear construction for reasons to be explained more in detail.

The above and other advantages and features of the present invention will become more readily understood from a consideration of the following detailed description taken together with the accompanying drawings, in which:

FIGURE 1 is a side sectional view of a preferred form of speed reducer incorporating the advantages and features of the present invention;

FIGURE 2 is a sectional view taken on line 2—2 of FIGURE 1 and illustrating in more detail the preferred gear form of the present invention;

FIGURE 3 is a side elevation of a modified form of speed reducer, in accordance with the present invention, shown partially in section;

FIGURE 4 is a sectional view taken on line 4—4 of FIGURE 3; and

FIGURE 5 is a fragmentary, detailed sectional view similar to FIGURE 2 but illustrating a further modification, in accordance with the present invention.

Referring in more detail to the drawings, there is shown by way of illustrative example in FIGURES 1 and 2 a speed reducer generally designated by numeral 10 and which is broadly comprised of a drive or input shaft 12, an output shaft 13 axially aligned but in spaced relation to the input shaft, and a pair of eccentrics 14 and 15 carried by the input shaft 12 for rotation therewith. Pinion or drive gear members 16 and 17 are mounted on the eccentrics 14 and 15, respectively, for epicyclic movement in response to rotation of the input shaft 12 about an internal gear 18 which as illustrated in FIGURES 1 and 2 is formed in the wall of the housing 20. In accordance with well-known practice, speed reduction of the unit is governed by the tooth ratio between the drive or external gear, in this instance the gears 16 and 17, and the internal gear 18 whereby the reduced speed of rotation of the drive gear assembly in relation to the input shaft is taken off by output means coupled to the drive gear assembly, the output means being illustrated here in the form of a crank disk 22 having pins 24 extending forwardly through pin receiving openings 25 in the drive gear assembly; the rotation of pins 24 and crank disk 22 in response to the reduced speed of rotation of the drive gear assembly is transmitted directly to the output shaft 13.

More specifically, the housing 20 is of generally cylindrical configuration having a flat base or stand 30, and the housing proper is divided into a main, shallow cylindrical area 31 to house the various elements including the drive gear assembly and crank disk along with a reduced cylindrical portion 32 at its output end. Suitable bearings, such as ball bearings 33, are inserted within the portion 32 to journal the output shaft 13 for rotation at the longitudinal axis of the housing. An end plate 34 closes the opposite end of the housing and is similarly provided with a reduced cylindrical opening 35 provided with ball bearings 36 to journal the input shaft at the longitudinal axis of the housing and in axial alignment to the output shaft 13. Any suitable source, not shown, may be employed for rotation of the input shaft; or, as an alternative and as an example, the input shaft may be defined by the drive shaft of the power source such as an electric motor.

Within the housing, the eccentrics 14 and 15 are disposed in adjacent but slightly spaced relation between the inner end of the bearings 36 and the innermost end of the input shaft by means of end retainer plates 38, one plate 38 being positioned between the eccentric 14 and bearings 36 and the other being held to the end of the shaft by means of a screw 39; also, an intermediate spacer 40 is positioned between the eccentric members. The eccentric members are keyed to the input shaft by forming mating keyways in the shaft and eccentrics for reception of a key 42 and, as will be noted from FIGURE 1, the eccentrics are so disposed in relation to the shaft as to be positioned in diametrically opposed relation to one another, or in other words will rotate 180° out of phase with one another. In turn, the pinions 16 and 17 are of annular shape and disposed in journaled relation on the respective eccentrics 14 and 15 preferably by disposition of needle or roller bearings 44 (depending upon the size of the unit) on the exterior surface. Here, it is important to note that through the journaled disposition between the pinions and eccentrics the pinion will be caused to trace an epicyclic path of movement in relation to the internal gear 18 in response to rotation of the input shaft and eccentric members. As best seen from FIGURE 2, each of the pinions 16 and 17 is provided, for the purpose of illustration, with four pin receiving, circular openings 25 for reception of the pins 24, and the external gear portion of each pinion is defined by an outer circumferential surface portion 46 interrupted by female or cavity elements 48 spaced at equal intervals therealong. Specifically, each cavity is of a semi-circular configuration symmetrical about a radial line extending outwardly from the eccentric center of the pinion and in a disposition parallel to the longitudinal axis of the housing.

Similarly, the internal gear 18, which is preferably formed as an integral part of the chamber wall of the housing 20 and is concentric with the longitudinal axis of the housing, is defined by a circumferential surface portion 50 having convex tooth elements 52 spaced at equal intervals for intermeshing, positive engagement with the cavity elements 48 on the pinion gears. Again, the tooth elements 52 are each of semi-circular configuration symmetrical about radial lines extending from the center of the housing and protrude outwardly from the circumferential surface of the internal gear while forming an integral part thereof. Furthermore, the radius of curvature of each tooth element corresponds to that of each cavity element and the spacing between tooth elements corresponds to the spacing between cavity elements. In this relation, by forming the gear portions as integral parts of the pinion gears and internal gear, it is possible to obtain very accurate alignment between the gear elements as defined by the tooth and cavity portions. In order to prevent interference between the gears as they successively move into and out of engagement, each pinion gear is of a pitch diameter no greater than that of the internal gear less the stroke of the eccentric member, where the stroke is equal to twice the eccentricity between the eccentric center and the center of the input shaft 12.

In order to gain an appreciation of the advantages of the gear form described, it is important to understand the distinctive manner in which the external gear portion on each pinion will move into and out of engagement with the internal gear. Referring to FIGURE 2, assuming that the input shaft and eccentric member 14 are under clockwise rotation, each cavity element 48 will undergo, in opposite counterclockwise progression, a rocking movement from one tooth to the next, closely conform to a path of travel along the radial line for each tooth element, and will similarly move away from engagement with each tooth element in the same manner.

Specifically, each revolution of the eccentric will cause advance of each individual cavity element, in an opposite rotational direction, from one tooth to the next. The path of movement each cavity follows under the influence of the eccentric will be seen from FIGURE 2, since the various positions illustrated in succession between the cavity and tooth elements also represent the individual positions each cavity element will assume in relation to a pair of tooth elements as the eccentric rotates through each revolution. This also best illustrates the manner in which each cavity will progressively advance from centered engagement with one tooth to the next, specifically by sliding away from one tooth essentially along the radial line passing through that tooth, gradually advancing toward the radial line of the next tooth as it clears the end of the one tooth, then finally moving into centered engagement with the next tooth as it moves outwardly along the radial line. In practice, any clearance provided between the tooth and cavity elements, as well as the circumferential surface portions, would be for the purpose of avoiding any slight binding but would in no way affect the characteristic movement of each cavity in relation to the teeth.

Realization of the above is important from the standpoint that with this particular type of gear form, the pressure angle theoretically will act directly through the radial line of each tooth extending from the center of the input shaft. Equally as important, the centered engagement thereby established between the complementary cavity and tooth elements will eliminate any frictional or sliding movement between the surfaces of the elements so as to eliminate any requirement of enlarging the cavity elements and thus greatly minimizing energy losses which would otherwise result due to friction and slippage therebetween. Recognition of this is also important from the standpoint of obviating the use of tooth or pin elements which are capable of rotation about their own axes to compensate for sliding engagement thought to occur, and a good illustration of the use of pins as separate tooth elements is seen from the aforementioned Henry Patent No. 2,520,282. In any event, integral formation of teeth of semi-circular configuration provides a tooth form where the thickest part of the tooth is at the baseline along the circumferential surface portion where bending moments, as well as critical shear stresses, occur as the teeth are engaged by the cavity elements. Other important advantages will be seen from a theoretical consideration of this tooth form compared with other forms, to be described, following a consideration of the manner in which the movement of the drive gear assembly is transmitted to the output shaft.

Briefly, each of the drive pins 24 is mounted in press-fit relation in openings provided adjacent the periphery of the crank disk 22, and each pin is so spaced and of a length to project forwardly through the openings 25 in the drive gear assembly as described. In turn, the crank disk 22 is keyed to the output shaft, such as by means of key 26 in much the same manner as the eccentric members are keyed to the input shaft; similarly, an end retainer plate 27 is shown held in place against the end of the disk by means of a screw 28 so as to position the disk between the end of the output shaft and the bearing assembly 33. The drive pins are dimensioned in relation to the openings so as to be freely movable therein and thereby to prevent binding due to horizontal and vertical displacement of the pinion gears, while following the circumferential movement of the pinion as it is caused to travel through a series of rocking movements about the internal gear surface. In this relation, it will be noted that each pinion gear will effectively rock around the drive pins 24 as pivots and for a more detailed description of this action, reference is made to aforementioned Patent No. 2,382,482.

As is well known, the speed reduction between the input and output shafts will be governed by the relative number of elements between the internal gear and each pinion gear according to the following ratio:

$$\text{Reduction} = \frac{El._{e.g.}}{El._{e.g.} - El._{i.g.}}$$

where $El._{i.g.}$ is the number of elements of the internal gear, and $El._{e.g.}$ is the number of elements on the external gear, assuming the pitch to be the same for the respective gear portions. The expression for speed reduction emphasizes another important feature of the present invention, particularly by comparison with other well-known tooth forms such as the involute form of tooth arrangement. Essentially, the semicircular tooth and cavity form of the present invention is based upon standard pitches. One important distinction, however, is that the radius of the elements is approximately one-quarter of the circular pitch and cannot exceed this amount. Referring to FIGURE 2 as an illustration, assuming that the pitch of the gears is six or six teeth per inch diameter, the tooth form would have a circular pitch of $\pi/6$ or 0.5236 inch, and the radius could not exceed 0.1309 inch, or the circular pitch divided by four. In this relation, the addendum of each tooth element would actually be the radius or depth of the tooth or, in other words, no more than 0.1309 inch. Accordingly, the pitch diameter of each pinion gear would be equal to the pitch diameter of the internal gear less twice the eccentricity of the pinion gear. An important difference here from ordinary tooth forms is that one gear member does not have tooth elements, but only inwardly directed cavity elements, each having a radius or dedendum equal to the radius or addendum of each tooth element so that it has been found possible to use a one element difference between the gear and pinion with no interference. Now, for a pitch diameter of 5.177 inches for the internal gear, the number of teeth for a six pitch gear would be 31 and it would be possible to have 30 cavity elements spaced about the circumferential surface portion of the pinion gear. From this, the speed reduction ratio would be 30/30−31, or a −30:1 speed reduction. As a result, coupled with the fact that the gear form of the present invention establishes non-slipping, centered engagement between the elements, it also secures notable improvements from the standpoint of a high speed reduction for a relatively low pitch and pitch diameter value. This is of considerable importance in that it permits smaller sized and compact gear systems whereas the individual gear elements are relatively large for a given speed ratio. This can be attributed not only to the fact that tooth or male portions are formed on only one gear but also to the actual tooth and cavity configuration and particularly where the radius of curvature of each is made to correspond to the addendum value based on the pitch and pitch diameter of the gear. By comparison, from a consideration of conventional tooth forms, for the same given internal gear pitch diameter, in order to obtain the same speed reduction, the pitch would necessarily be increased substantially, thus requiring a greater number of teeth and resulting in much smaller and weaker tooth construction.

A modified form of invention is illustrated in FIGURES 3 and 4 where the major distinction resides in the fact that the gear form is reversed in relation to that shown in the first form, the tooth elements being shown as integral parts of the pinion gears, and the cavities being formed in the internal gear. FIGURE 3 shows a rigid housing 60 defining intercommunicating, coaxial, cylindrical chambers opening through opposite ends of the housing perpendicular to the plane of the base 61. A circular end plate 62 detachably closes, as by means of cap screws 63, the end opening of the housing chamber of greater diameter and the plate is apertured for the rotatable accommodation of a power input shaft 64 conveniently sealed as at 65 perpendicularly therethrough. A cover plate 66 similarly closes the end opening of the housing chamber of lesser diameter in a detachable association with the housing typified by the cap screws 67, and a power output shaft 68 is sealed as at 69 centrally and perpendicularly through said plate 66 for rotation independently of the input shaft. The output shaft 68 traverses the full extent of the housing chamber of lesser diameter and is supported therein for free rotation as by means of the antifriction bearing assembly 70 in fixed connection at its inner end with a circular drive plate or crank disk 71 sized and accommodated for rotation with the shaft in the housing chamber of greater diameter adjacent its junction with the chamber of lesser diameter, and the inner end of the shaft 68 is socketed for the reception and support of the inner end of the shaft 64, the latter being free to rotate independently of the output shaft by means of the antifriction bearing assembly 72. Between the cover plate 62 and the drive plate 71, the shaft 64 serves to carry spaced, circular eccentrics 73 with antifriction bearing assemblies mounted on the outer periphery of each eccentric as at 74 to support in journaled relation on the eccentrics a pair of circular drive gears or pinions 75 of an effective diameter less than that of the housing chamber so as to establish peripheral engagement of the drive gears with the interior wall of the chamber at the gear arc of maximum eccentricity. Again, rotation of the shaft 64 acting through the eccentrics 73 will operate to roll said gears 75 about the inner surface of the internal gear formed at the wall of the chamber so as to undergo epicyclic movement in response to tracking engagement of the drive gears with the internal gear. The crank disk 71 is again operatively coupled to the drive gears by means of a spaced succession of like drive pins 76 projecting perpendicularly from the disk through circular apertures similarly intersecting both gears 75 in partially overlapping registration while receiving the pins 76 and each of the pins is bushed as at 77 to minimize friction caused by working contacts with the margins of the apertures thereby traversed. Accordingly, the unit functions essentially in the same manner as the preferred form whereby rotation of the input shaft 64 through the eccentrics 73 causes epicyclic movement of the drive gears 75 about the internal wall of the chamber at a reduced speed.

The gear form of FIGURES 3 and 4 is specifically defined by an internal ring gear simulation on the appropriate zone of the housing chamber wall constituted as a uniformly-spaced succession of concave, transversely semi-circular, cavities 78 paralleling the axis of the unit assembly across the zone opposed to the peripheries of both gears 75 with their centers of arc, or radii, on circles concentric with the unit axis, and a complementary succession of convex, semi-circular ribs 79 radially obtrude from the periphery of each gear 75 in a uniformly-spaced arrangement parallel to the gear axes appropriate for meshing coaction with the cavities 78 as the gear arcs of maximum eccentricity are caused to orbitally traverse the latter. Centered on a pitch line coincident with the circular inner wall of the housing chamber of greater diameter, the cavities 78 are of like circular arcs whereof the common radius is such as to provide a desired effective number of the cavities in an angular spacing, or circular pitch, measuring four times such radius, in which correlation the corners marking intersection of the cavity arcs with the chamber wall are convexly relieved to a radius approximately one-third the length of the cavity arc radius. Complementarily coactable with the cavities 78, the ribs or teeth 79 peripherally featuring the gears 75 are centered on a pitch line outwardly paralleling the gear circumference at a spacing therefrom representing the requisite mechanical clearance of the gears relative to the chamber wall in an angular spacing, or circular pitch, the same as that of the cavities 78 and a number consequently less than the number of said cavities, which ribs 79 are convexly arched to a radius less than that of the cavities 78 by the amount of the clearance provided and are arcuately and narrowly filleted at their intersections with the periphery of the associated gear. Constituted as shown and described, the cavity and rib arrangement is operative effectively with a slight rolling action of the ribs engaging the cavities to maintain a strong, extensive, positive power-transmitting intermesh of enhanced durability, ease and economy of production, and minimal noise at high operating speeds.

Analogous to the cavity and rib arrangement of FIGURES 3 and 4 just discussed, the modification according to FIGURE 5 utilizes a cavity and rib conformation, spacing, and operative correlation identical with that described for the elements 78 and 79 and distinguishes only in the provision of an annular zone, or band, 80 of stiffly-resilient material, such rubber, certain of the synthetics, and the like, fixed in and to the wall of the housing chamber of greater diameter for coaction with the peripheries of the gears 75 as above set forth and mounting the cavities 78 as interruptions of its inner circular face in the association above specified for operative intermesh with the ribs 79 of said gears. Obviously, the arrangement typified by FIGURE 5 may be reversed to present the cavities 78 in the hard material of the chamber wall, as in FIGURES 1 and 2, and to constitute the ribs 79 from the resilient material applied to fixedly and concentrically embrace the separate gears 75 as the peripheral zones thereof.

The same geometrical considerations will apply to the modified forms as to the preferred form in determining the size and spacing of the tooth and cavity elements, and the speed reduction would be the same for a corresponding ratio between the elements of the internal gear and the drive gears whether the tooth elements are on the internal gear or the drive gears. Another characteristic to be noted from FIGURES 3–5 and which is in common with the preferred form of FIGURES 1 and 2 is the 180° out-of-phase relationship in rotation of the pinion gears. It is emphasized that this will in no way affect the reduction between drive and driven members but in accordance with well-known practice is useful in preventing backlash and in balancing rotation of the elements at high speeds. On the other hand, the preferred form of FIGURES 1 and 2 represents an improvement over the modified form in that it is more compact and of simplified construction. For example, the needle bearings 44 are employed between the eccentrics and drive gears to substantially reduce the spacing therebetween; also, the eccentrics are separately keyed to the common input shaft and maintained in spaced relation in a simplified manner. The latter permits greater ease of formation and mounting of the eccentrics in desired relation on the shaft.

It will be evident from the foregoing that utilization of the gear form in accordance with the present invention, particularly in association with epicyclic gearing of the class described, provides for a greatly improved speed reduction system especially from the standpoint of greatly improved speed reduction characteristics, requirement of a minimum number of parts, high strength gear construction and relatively few, but larger sized, elements for a correspondingly high speed reduction while eliminating a number of objectional aspects inherent in known forms of tooth construction.

It is accordingly to be understood that various changes and modifications may be made, in the forms illustrated, by those skilled in the art without departing from the spirit and scope of the present invention, as defined by the appended claims.

What is claimed is:

1. In a speed changing device, a gear form for establishing non-slipping epicyclic motion between circular internal and external gear portions, the external gear being eccentrically mounted for rotation about the internal gear and having a pitch diameter no greater than that of the internal gear less twice the eccentricity of the external gear, said tooth gear form being constituted of a circumferential surface portion at the pitch diameter of one gear portion having a plurality of equally spaced tooth elements of convex semi-circular configuration radially obtruding therefrom, and a circumferential surface portion at the pitch diameter of the other gear portion having a plurality of equally spaced cavity elements of semi-circular configuration directed inwardly therefrom, said tooth and cavity elements corresponding in spacing and radius of curvature to provide for intermeshing centered engagement between said elements.

2. In a speed changing device according to claim 1, said other gear portion having the cavity elements being composed of resilient material.

3. In a speed changing device having a drive shaft, an eccentric carried by the shaft for rotation therewith, an internal gear of annular configuration disposed in outer, spaced concentric relation to the drive shaft, a pinion gear being journaled on the eccentric for epicyclic movement about the inner circumferential surface of said internal gear, and output means coupled to said pinion gear including an output shaft for rotation in response to the movement of said pinion, the combination therewith of a gear form for said pinion gear and internal gear, said gear form comprising a plurality of semi-circular tooth portions protruding in uniformly spaced relation from the circumferential surface of one of said gears, and a plurality of complementary, semi-circular cavity portions intruding in uniformly spaced relation from the circumferential surface of the other of said gears for interengagement with said tooth portions, and said pinion gear having at least one less portion on its circumferential surface than said internal gear thereby to govern the relative speed between said drive shaft and said output shaft.

4. In a speed changing device according to claim 3, the tooth portions of said gear form being spaced along the circumferential surface of said pinion gear and said cavity portions being spaced along the inner circumferential surface of said internal gear.

5. In a speed changing device according to claim 3, the tooth portions of said gear form being uniformly spaced along the circumferential surface of said internal gear, and said cavity portions being spaced along the circumferential surface of said pinion gear.

6. In a speed changing device according to claim 3, the tooth and cavity portions of said gear form having equal radii of curvature and equal spacing between the portions of each gear for centered, non-slipping engagement therebetween.

7. In a speed changing device according to claim 1, the radii of said tooth and cavity elements being equal to no more than $\tfrac{1}{4} P_c$ where $P_c$ is the circular pitch of said gears.

References Cited in the file of this patent
UNITED STATES PATENTS

| | | |
|---|---|---|
| 2,830,458 | Sundt | Apr. 15, 1958 |
| 2,861,481 | Sundt | Nov. 25, 1958 |
| 2,874,594 | Sundt | Feb. 24, 1959 |
| 2,932,992 | Larsh | Apr. 19, 1960 |
| 2,990,130 | Pons | June 27, 1961 |